Nov. 15, 1932.  E. A. NELSON  1,887,513
WIRE WHEEL
Filed March 15, 1930  2 Sheets-Sheet 1

INVENTOR
EMIL A. NELSON.
BY
Harness, Dickey, Pierce & Hann
ATTORNEYS.

Nov. 15, 1932.  E. A. NELSON  1,887,513
WIRE WHEEL
Filed March 15, 1930  2 Sheets-Sheet 2
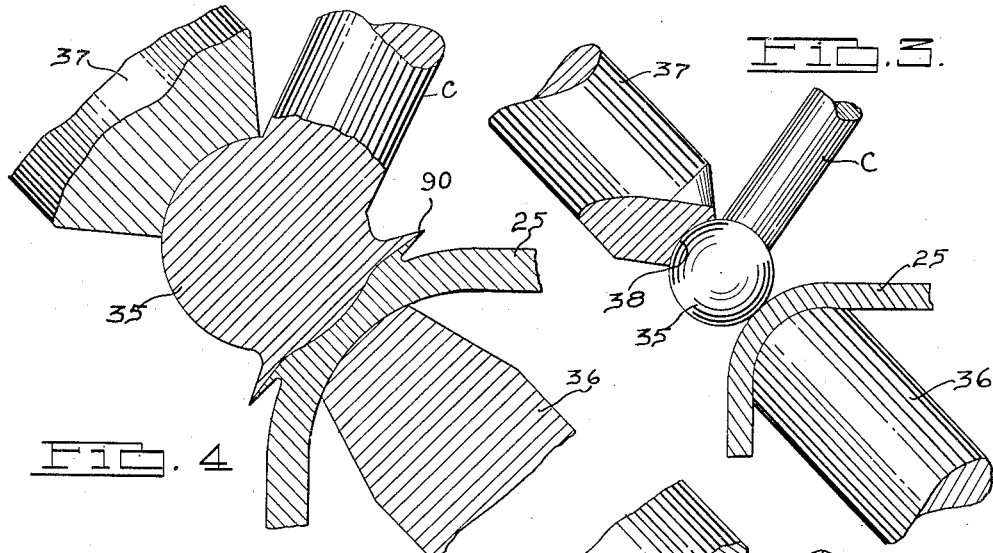
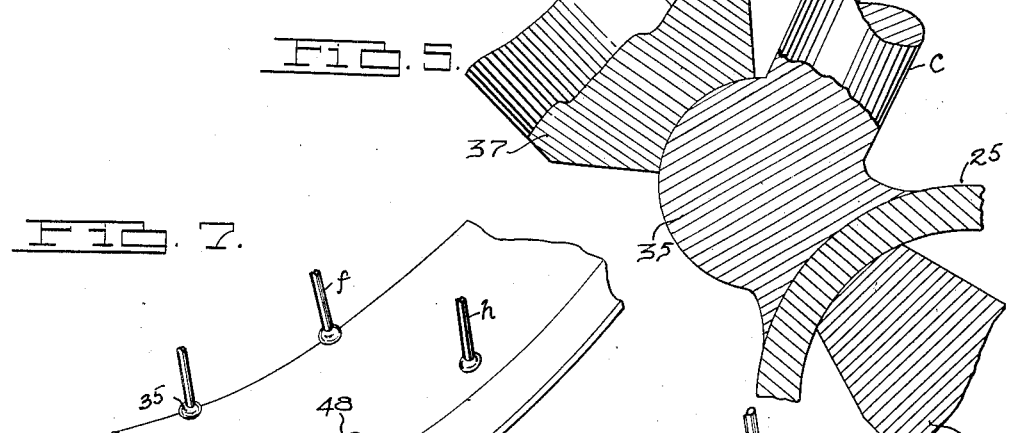
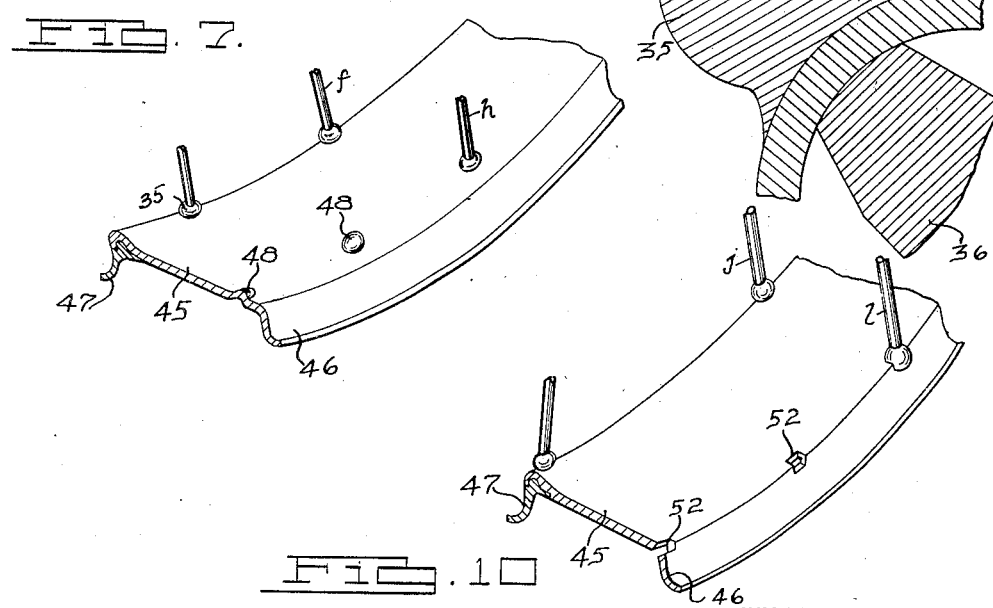
INVENTOR
EMIL A. NELSON.
BY
Harness, Dickey, Pierce & Hann
ATTORNEYS.

Patented Nov. 15, 1932

1,887,513

UNITED STATES PATENT OFFICE

EMIL A. NELSON, OF DETROIT, MICHIGAN, ASSIGNOR TO MOTOR WHEEL CORPORATION, A CORPORATION OF MICHIGAN

WIRE WHEEL

Application filed March 15, 1930. Serial No. 436,233.

This invention relates particularly to wheels, and particularly to that type thereof known as wire wheels in which the rim and hub portions of the wheel are joined together by laced spokes designed primarily to take the load on the wheel through tension in the spokes, as differentiated from wood or like wheels in which the load on the wheels is taken wholly through compression in the spokes.

The main objects of the invention are to provide a wire wheel that is economical to manufacture; to provide a wire wheel having a new and novel arrangement of spokes; to provide a new and novel method of securing a rod to a member by a welding operation; to provide a new and novel method of securing spokes to a wire wheel; to provide a wire wheel having spokes of new and novel construction; to provide a new and novel method of welding such spokes to a wheel; to provide a new and novel method of locating the spokes of a wire wheel relative to the hub or rim sections during the process of welding the spokes to the wheel and rim sections; to provide a means for stiffening the spokes of a wire wheel whereby to better permit them to transmit the load on the wheel by compressive stresses set up within the spokes; to provide a wire wheel construction wherein the brake drum is utilized for stiffening the assembled structure; to provide a spoke for wire wheels having a new and novel end construction better adapting the same for welding to a rim or hub section; and to provide other new and novel constructions and methods of operation or manufacture that will hereinafter be specifically pointed out or will be apparent in the following specification, reference being had to the accompanying drawings, in which Fig. 1 is a fragmentary side view of a wire wheel.

Fig. 3 is a more or less diagrammatic fragmentary partially section view illustrating the first step in the welding of a spoke to its supporting member.

Fig. 4 is an enlarged view similar to Fig. 3 showing the formation of the weld between the spoke and the supporting member at an intermediate stage of operation.

Fig. 5 is a view similar to Fig. 4 showing the formation of the spoke end after the welding operation has been completed.

Fig. 7 is a fragmentary perspective view illustrating the method of forming the rim shown in Figs. 5 and 6 in order to facilitate locating the spoke ends with respect thereto during the welding operation.

Fig. 10 is a view similar to Fig. 7 illustrating the manner of forming the rim for locating the spokes during the welding operation in the construction illustrated in Figs. 8 and 9.

It is conventional practice in the formation of wire wheels to provide headed spokes which are passed through openings in either the hub or the rim portion and which are anchored in such portions by means of the heads of the spokes engaging a surface of the same, and to provide nut members threadably engaging the opposite end of the spokes and the other of such members for the purpose of placing the spoke under the proper tension. It has lately been suggested, and particularly in constructions adapted for use in connection with motor vehicles, to weld the spokes to the rim and hub sections instead of employing the conventional method. It has been the general practice in employing this welding method to utilize spokes having a greater section than is normally employed with the threaded type of spokes and, consequently, in which the spokes may, to a certain extent, transmit the load by compressive stresses set up therein, although it is to be understood that the greater part of the load is carried by the spokes in tension the same as in the conventional threaded construction.

It has been my experience that in the constructions heretofore proposed for employing welded on spokes, the method of welding employed has necessarily resulted in forming an apparent "flash" at the point of welding between the spokes and the rim or hub, and the removal of this flash, in order to form a presentable finished product, has necessitated the expenditure of a relatively great amount of time and labor with resulting expense, and results in a product that is more or less inferior in appearance. One of the primary objects of the present invention, as above stated, is to provide a method of securing such spokes by the welding process to the rim or hub members which will eliminate the presence of a flash that requires subsequent removal; that will facilitate the welding of the spokes to the rim or hub members; that will provide a greater bond between the spokes and the co-operating members than in constructions heretofore proposed; and that will result in a generally more efficient and more economical construction throughout. In addition I prefer to employ spokes of a size sufficient to act as struts and thereby take the load imposed on the wheel by compressive stresses therein as well as tensile stresses.

Figure 1:
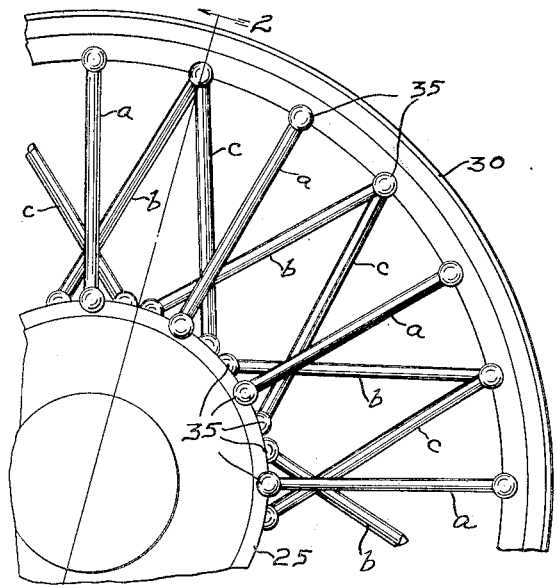
Figure 2:
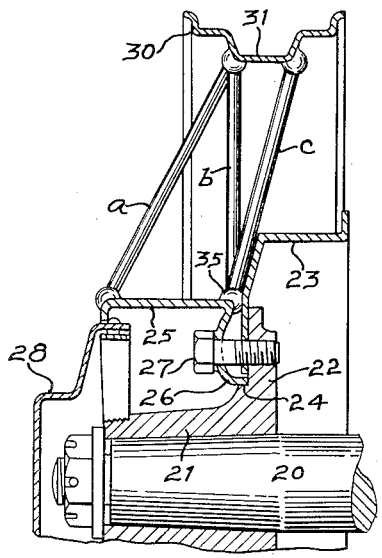
Fig. 2 is a fragmentary sectional view taken on the line 2—2 of Fig. 1.

In the accompanying drawings the above mentioned method is illustrated with a wire wheel having a novel form of spoke lacing or arrangement of spokes, designed to give maximum strength with minimum weight, this being a further object of the present invention. Referring now to Figs. 1 and 2 I show an axle shaft 20 upon which is secured in a conventional manner a hub member 21. The hub member 21 is provided with a radially extending flange 22 upon which is mounted a brake drum 23 of conventional form. The flange 22 is provided with an annular shoulder 24 which serves to locate a hub member 25 concentrically with the hub 21 by engaging the inturned flange 26 of the hub member 25 as indicated. Bolts such as 27 extending through the flange 26 and through the brake drum 23 thread into the flange 22 and serve to hold both the hub member 25 and brake drum 23 in place upon the hub 21. The outer ends of the hub 25 may be closed against the entrance of dust and dirt by means of a removable cap structure 28 of any suitable construction.

The particular rim structure shown in Figs. 1 and 2 is shown as what is generally known as a drop center rim, that is, the rim 30 is provided with a central inwardly depressed channel portion 31 forming an annular groove around the rim which facilitates removal of the co-operating tire (not shown) without the necessity of providing removable side flanges, as in other types of unsplit rims. The spokes of the wheel in Figs. 1 and 2 are shown as being secured at one end to the front and rear corners of the hub 25 and secured at their opposite ends to the inner and outer corners of the channel portion 31 of the rim 30. In accordance with the present invention three series of spokes are employed and comprises series of spokes $a$ which extend from the outer corner of the hub 25 to the outer corner of the channel 31; all of these spokes lying in a plane including the axial line of the wheel, so that viewed in side view, as in Fig. 1, the spokes appear to extend radially of the wheel. The second series comprises the spokes $b$ which extend from the inner corner or edge of the hub 25 to the outer corner or edge of the channel 31 of the rim. The point of connection of the spokes $b$ with the rim is removed in a clockwise direction, as viewed in Fig. 1, from a plane including the axis of the wheel and passing through the point of connection of the corresponding spokes with the hub 25. As indicated in Fig. 2, the spokes $b$ preferably lie in a plane substantially normal to the axial line of the wheel. The third series of spokes are the spokes $c$ and these spokes extend from the inner edge or corner of the hub 25 to the inner edge or corner of the channel portion 31 of the rim. The point of connection between the outer ends of the spokes $c$ with the channel portion 31 of the rim is removed in a counter-clockwise direction as viewed in Fig. 1 from a plane including the axis of the wheel and passing through the point of connection of the corresponding spokes with the hub 25. The inner ends of the spokes $b$ and $c$ are so spaced circumferentially of the hub 25 as to provide ample clearance for the spokes $b$ and $c$ where they cross each other as viewed in Fig. 1. Furthermore I prefer the outer ends of each set or pair of spokes $b$ and $c$ to be secured to the channel 31 along a single line parallel to the axis of the wheel, this being best shown in Fig. 1.

With this construction it will be apparent that I have provided a construction able to withstand relatively great torsional loads on the wheel, as well as relatively great side stresses upon the wheel, and that in making the spokes of relatively greater size than is ordinarily the practice, they serve as struts and are enabled to transmit a relatively great amount of compressive stresses which result in the corresponding increase in the strength of the wheel as a whole.

It will be noted that each of the spokes $a$, $b$ and $c$ is provided at each end with a smooth spherical head 35. This general shape of the head is an important feature in connection with the method of securing the spokes to the hub and the rim by welding, which is accomplished in the following manner. Referring to Fig. 3 it will be noted that the spherical head 35 is of substantially greater diameter than the corresponding spokes $c$. In securing the spokes to the hub the head 35 is placed against the corner of the hub 25 as indicated. It is to be noted, however, that the present method of securing the spokes to either the hub or the rim is equally applicable no matter to what portion of the hub or rim the spoke is to be secured, it being shown in Fig. 3 as being secured to a corner of the hub for the reason that it is the location of the spokes I desire in connection with the wheel shown in Figs. 1 and 2 in order to obtain maximum strength, as well as to permit the line of force acting on the electrodes, presently described, to pass through the point of contact of the head 35 and the hub 25.

With the ball head 35 placed against the hub as shown in Fig. 3 an electrode 36 shaped to fit the inner surface of the hub 25 as shown is placed in position in line with the head 35 and another electrode 37, provided with an end surface 38, fitting a portion of the head 35 is placed thereagainst as indicated in Fig. 3 and suitable but relatively light pressure is applied in a conventional manner to urge the electrodes 36 and 37 toward each other. Current is then applied to the electrodes 36 and 37 in the conventional manner, and due to the electrical resistance between the ball 35 and hub 25 sufficient heat is generated in the ball and in the hub to cause the metal thereof immediately adjacent the point of contact between them to melt and diffuse into each other, and thereby results in the welding of the head 35 to the hub 25. It is to be particularly noted that with this construction when the current is first applied to the electrodes 36 and 37 a minimum surface area between the ball 35 and hub 25 is available and consequently a maximum resistance is present at this point to engender melting of the metal. It will also be apparent that as the metal of the ball 35 melts the area of contact between it and the hub 25 will increase, thus decreasing the resistance to the passage of electrical current between the ball 35 and the hub 25.

I take advantage of this phenomenon in order to obtain a perfect weld of predetermined dimensions between each head 35 and hub 25, or other member as the case may be, by so limiting the electrical current passing between the electrodes 36 and 37 that when the surface of the ball 35 has melted a predetermined amount the area of contact between the ball 35 and the hub 25 will have reached such an extent as to reduce the resistance between these two parts to a value less than that required to generate sufficient heat to cause a further melting of the metal.

In other words, as soon as the ball 35 has melted sufficiently to provide an area of contact between itself and the hub 25 necessary for a perfect weld of the required strength, the resistance between the ball 35 and hub 25 will have become so small that the heat generated by such resistance to the passage of electrical current between the electrodes 36 and 37 will have been reduced to a point insufficient to cause further melting of the metal. It will, of course, be apparent that the particular amount of contact area between the ball 35 and hub 25 at which the welding process will stop may be varied as desired by simply varying the amount of current which is passed between the electrodes 36 and 37.

In carrying out this welding process the metal at the point of junction between the head and the supporting member becomes fluid and, due to the pressure upon the electrodes, flows outwardly, forming a sharp edged flash such as is indicated at 90 in Fig. 4, and which is approximately evenly made up of metal from both the head 35 and the supporting member. As will be apparent from an inspection of Fig. 4, this flash, unless taken care of in some manner, would be objectionable in appearance, although it will be seen that through its formation a maximum area of welded surface between the head and the supporting member is provided. In accordance with the present invention this flash is rendered free from objection from the appearance standpoint in the following manner.

It will be understood from the above description that by the time the amount of flash indicated in Fig. 4 has been formed, the area of contact between the head and its co-operating member has increased to such an extent that no further melting of the metal will occur. However, immediately this amount of flash has been formed, the metal in the adjacent surfaces of the head and the support are extremely hot and have approached a fluid condition. Accordingly, immediately this amount of flash is formed I increase the pressure tending to force the electrodes 36 and 37 together a sufficient amount to bend or work the flash 90 down into contact with the support 25 as indicated in Fig. 5. This operation causes the flash to form a smooth fillet between the ball and the support which enhances the appearance of the connection. The operation is of course accomplished in a very short interval of time and the mechanism for varying the pressure on the electrodes 36 and 37 may be automatically controlled, whereby the light pressure is applied for a predetermined time element necessary to form the flash and then increased to move the flash into contact with the support.

It will be recognized that if the heavy pressure was applied while the metal was still fluid under the initial small contact area and resulting high resistance, a flash of such extent would be produced as to obviate subsequent treatment thereof as indicated and that, therefore, the initial pressure must be so controlled as to enable a flash of no greater extent than may be treated as described to be formed. It will, of course, be apparent that the result is a connection not only pleasing in appearance but of relatively great strength and I have found that by this method the weld is materially stronger than the metal of either the spoke or the support itself outside of the weld.

Another feature that may be noted is that with this construction the line of pressure through the electrode contacting against the head 35 may be so directed that it passes through the point of initial contact between the head and the hub or other member, and this is extremely important in the instance noted for it thus eliminates any tendency of the head to shift on the hub during the welding process, and which shifting might tend to set up either compressive or tensile stresses in the spoke which would thereafter affect the true contour of the finished wheel. Thus, in a wheel manufactured in accordance with the present invention as described, no subsequent truing operation is required. Furthermore it will be noted that this construction permits simple one-piece electrodes of cheap and easily cooled formation to be employed, whereby the tool cost and tool upkeep in manufacture are a minimum.

Referring back to Fig. 2, it will be noted that in accordance with the further object of the present invention I prefer, after the spokes have been welded to the hub 25 and rim 30 to place the wheel in a lathe or other machine and face off the ball ends 35 at the inner ends of the spokes $a$, $b$ and $c$ in a plane normal to the axis of the wheel so as to provide a plurality of flat seats for contact with the drum 23, thus acting to clamp the drum more evenly to the flange 22 of the hub 21 upon assembly as indicated.

Figure 6:
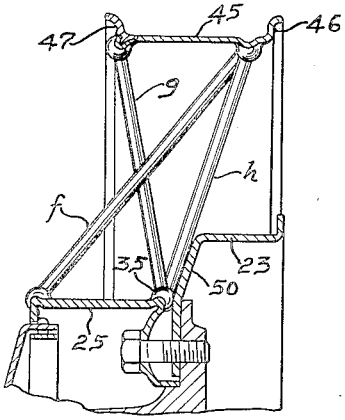
Fig. 6 is a view similar to Fig. 1 showing a modified form of construction.

In Fig. 6 I show a slightly modified form of spoke lacing. In this construction I provide one series of spokes F which extend radially in side view the same as the spokes $a$ of Fig. 1, and, as viewed in Fig. 6 extend from the outer edge of the hub 25 to a point adjacent the inner edge of the rim 45, the rim 45 in this case being shown of a conventional type having a single integral side flange 46 and a removable split flange ring 47 at the opposite side. I then provide a series of spokes $g$ which extend outwardly from the hub 25 in a clockwise direction as viewed in side view, corresponding to the spokes $c$ of Fig. 1, the outer ends of the spokes $g$ being joined at points adjacent the outer edge of the rim 45. I then provide a third series of spokes $h$ which extend outwardly from the hub 25 to the rim 45 in a counter-clockwise direction as viewed in side view, in the same manner as the spokes $b$ in Fig. 1, and the outer ends of these spokes join the rim 45 adjacent the inner edge of the same and in opposed relation to the point of junction of the spokes $g$ with the rim 45. The result of this construction is substantially the same as that described in connection with Figs. 1 and 2, with the exception that perhaps it is a little stronger due to the fact that the spokes $g$ and $h$ extend to opposite sides of a plane normal to the axis of the wheel and passing through the point of junction of the spokes $g$ and $h$ with the hub 25 and at an equal angle on either side of such planes.

An additional feature is shown in this figure for the purpose of aiding in the manufacturing of the wheel. As best indicated in Fig. 7, it will be noted that the rim 45 is provided with a plurality of projections 48 on its inner surface, these projections being spaced in the circle in which the outer ends of the spokes are joined to the inner edge of the rim 45 and being spaced around the rim in accordance with the spacing of the spokes on such circle. In operation, the outer ends of the spokes are welded to the projections 48, the projections 48 thus serving as a means for locating the outer ends of the spokes in proper relation to the rim 45 both circumferentially of the rim and axially thereof.

In Fig. 6 will be noted a further feature. In this case the ball ends 35 of the spokes are so faced off on their inner side, and the brake drum 23 is so formed, that when the wheel is assembled with the brake drum the beveled portion 50 of the brake drum contacts over its length with the spokes $h$, the brake drum thus serving to stiffen the spokes for this portion of their length and permitting them to better withstand compressive stresses set up therein.

Figure 8:
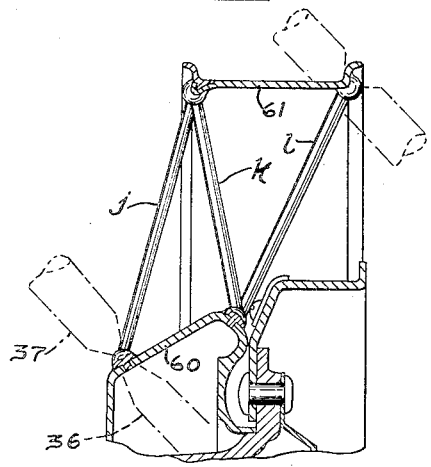
Fig. 8 is a view similar to Fig. 6 showing a slightly modified form of construction.
Figure 9:
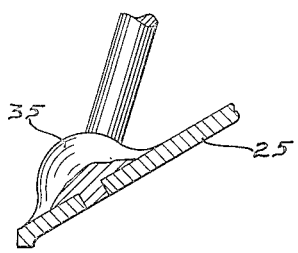
Fig. 9 is an enlarged, fragmentary, partially sectioned view showing more clearly the union between the spokes and the hub of the construction shown in Fig. 8.

A further modification of means for locating the ends of the spokes relative to the rim and the hub is indicated in Figs. 8, 9 and 10. In this case, as best illustrated in Fig. 10, instead of employing projections such as 48 in Fig. 7, the rim 45 is provided with apertures 52 located in the same manner as described in connection with the projections 48, and thus serving to locate the ends of the spokes relative to the rim and the hub. In this construction as indicated in Fig. 9, when the head or ball end 35 is welded to its co-operating member, shown in Fig. 9 as the hub 60, the metal of the ball 35 in melting runs into and fills the corresponding aperture 52 ase clearly indicated in Fig. 9, and thus serves to provide a more secure union between the spoke and its co-operating member.

It will be noted that the spoke lacing in Fig. 8, as well as the formation of the hub itself, is slightly different from that illustrated in Fig. 6, the spoke lacing more nearly approaching the construction shown in Fig. 2. In other words, spokes $j$, corresponding to the spokes $a$ in Fig. 2, and spokes $f$ in Fig. 6 extend from the outer end of the hub 60 to the outer end of the rim 61, which is shown as of the same type as rim 45 in Fig. 6. The spokes $k$ and $l$ correspond to the spokes $b$ and $c$, respectively, of Fig. 2 and $g$ and $h$, respectively, of Fig. 6, it being understood that all of the spokes $j$, $k$ and $l$ extend in the same relative direction, viewing the wheel from the side, as the corresponding spokes in the other modifications previously described.

While I have shown a particular form of spoke lacing in the drawings, it will of course be understood that as far as the method of securing the spokes in place is concerned, I do not limit myself to any specific type of lacing construction, as it will be obvious that this method of securing the spokes in place is equally applicable to any type of lacing construction.

While I have shown and described the heads on the spokes 9 being spherical in shape, it will be apparent that this is not entirely essential to the proper practice of the present invention, but that such heads may be made egg-shaped or otherwise modified, the only necessity being, as far as the present invention is concerned, that these heads be of materially greater diameter than the spokes or rods upon which they are formed, and that the surface thereof which contacts against the member to which they are to be secured extends in a smooth and unbroken curvature away from such point of contact an amount sufficient to insure any flash that may appear, to be formed from the smooth and unbroken surface of the head. In other words, I do not desire any sharp edges on the head which are so positioned that the metal forming the same will become fluid during the welding process and form a part of the flash, for in such case the formation of the flash will be engendered at such sharp edge and will become unmanageable in the manner described in connection with the flash illustrated in Fig. 4. This interpretation of the term employed for designating the head will, therefore, be taken into consideration in the interpretation of the following claims.

These and other formal changes may be made in the specific embodiment of the invention described without departing from the spirit and substance of the broad invention, the scope of which is commensurate with the appended claims.

I claim:

1. In combination, a rotatable hub, a brake drum secured thereto for equal rotation therewith, a wire wheel secured to said hub for equal rotation therewith and comprising a hub shell, a rim and spokes interconnecting the two, the inner ends of at least a part of said spokes being welded to said hub shell adjacent the inner end thereof and being provided with enlarged heads at their points of connection with said hub shell, said heads being faced off on the inner end of said shell in a plane normal to the axis of said shell, and means for clamping said faced off sides against said brake drum.

2. In a wire wheel, a hub and a rim interconnected by spokes, the spokes having enlarged ends with angularly disposed faces on each end in surface welded engagement with complementary angularly disposed faces of the hub and rim.

3. In a wire wheel, a hub and a rim interconnected by spokes, the spokes having enlarged ends with concave portions, the hub and rim presenting convex shoulders seated within the concave portions of the enlarged spoke ends.

4. In a wire wheel, a hub and a rim interconnected by spokes having enlarged ends, the connection between the spokes and the hub and rim being convex shoulders of the hub and rim seated within and welded to concave portions of the enlarged spoke ends.

EMIL A. NELSON.